(12) United States Patent
Andrews

(10) Patent No.: US 11,895,998 B2
(45) Date of Patent: Feb. 13, 2024

(54) TACKLE BOX WITH POLE SUPPORT

(71) Applicant: Stewart Andrews, Burbank, WA (US)

(72) Inventor: Stewart Andrews, Burbank, WA (US)

( * ) Notice: Subject to any disclaimer, the term of this patent is extended or adjusted under 35 U.S.C. 154(b) by 176 days.

(21) Appl. No.: 17/668,488

(22) Filed: Feb. 10, 2022

(65) Prior Publication Data
US 2022/0159939 A1 May 26, 2022

Related U.S. Application Data

(63) Continuation-in-part of application No. 14/283,519, filed on May 21, 2014, now abandoned.

(51) Int. Cl.
*A01K 97/06* (2006.01)
*A01K 97/10* (2006.01)

(52) U.S. Cl.
CPC .............. *A01K 97/06* (2013.01); *A01K 97/10* (2013.01)

(58) Field of Classification Search
CPC ......... A01K 97/06; A01K 97/10; A01K 97/22
USPC ..... 43/21.2, 54.1; 206/315.11; 224/920, 922
See application file for complete search history.

(56) References Cited

U.S. PATENT DOCUMENTS

| | | | | |
|---|---|---|---|---|
| 2,555,073 A * | 5/1951 | Zdankoski | ............. | A01K 97/22 294/143 |
| 2,596,403 A * | 5/1952 | Hoffman | ................ | A01K 97/10 43/21.2 |
| 2,971,735 A * | 2/1961 | Johnson | ................ | A01K 97/10 248/533 |
| 3,095,663 A * | 7/1963 | Miller | ................... | A01K 97/10 43/21.2 |
| 3,327,978 A * | 6/1967 | Gates | ..................... | A01K 97/10 248/528 |
| 3,389,489 A * | 6/1968 | Burns | .................. | A01K 97/125 43/17 |
| 3,543,432 A * | 12/1970 | Gates | ..................... | A01K 97/10 43/21.2 |
| 3,546,805 A * | 12/1970 | Schaefer | ............... | A01K 97/10 43/17 |

(Continued)

FOREIGN PATENT DOCUMENTS

| | | | | |
|---|---|---|---|---|
| FR | 2685606 A1 * | 7/1993 | ............ | A01K 97/10 |
| FR | 2704725 A1 * | 11/1994 | ............ | A01K 97/06 |

(Continued)

*Primary Examiner* — Darren W Ark
(74) *Attorney, Agent, or Firm* — Michael L. Greenberg, Esq.; Greenberg & Lieberman, LLC

(57) ABSTRACT

A tackle box equipped with a fishing rod holder, configured to facilitate the resting of a fishing pole, even while in use, in a secure manner is described. The tackle box is equipped with an extendable support, equipped with a location in which an end of a handle of the fishing rod or pole may be placed. A rest is configured to extend up and away from a top and side of the tackle box, functioning as a fulcrum to aid the stability of the tackle box when holding a rod in an upright position. The rest is equipped with a V-shaped cutout in which a midsection of the handle of the fishing pole may securely rest. A lip of the extendable support maintains contact with the pole, counteracting the force applied to the rod by the fish, preventing the pole from toppling over. Weight of the tacklebox itself is employed to counteract the force exerted on the rod by the fish to maintain stability.

12 Claims, 2 Drawing Sheets

(56) References Cited

U.S. PATENT DOCUMENTS

| | | | | |
|---|---|---|---|---|
| 3,555,719 A * | 1/1971 | Butler | A01K 97/10 | 248/538 |
| 3,571,964 A * | 3/1971 | Bogathy | A01K 97/10 | 43/21.2 |
| 3,659,369 A * | 5/1972 | Hermanson | A01K 97/10 | 220/735 |
| 3,670,443 A * | 6/1972 | Federline | A01K 97/125 | 43/17 |
| 4,014,128 A * | 3/1977 | Hrdlicka | A01K 97/10 | 248/528 |
| 4,095,364 A * | 6/1978 | Prine | A01K 97/10 | 43/21.2 |
| 4,106,811 A * | 8/1978 | Hernandez | A01K 97/22 | 297/188.09 |
| 4,234,154 A * | 11/1980 | Walters | A01K 97/10 | 248/539 |
| 4,479,322 A * | 10/1984 | Koppel | A01K 97/10 | 248/528 |
| 4,815,593 A * | 3/1989 | Brown | B60R 7/08 | 206/315.11 |
| 4,841,660 A * | 6/1989 | James | A01K 97/06 | 224/244 |
| 4,845,881 A * | 7/1989 | Ward | A01K 97/22 | 43/21.2 |
| 4,848,021 A * | 7/1989 | Simko | A01K 97/10 | 43/21.2 |
| 4,953,318 A * | 9/1990 | Vasseur, Jr. | A01K 97/10 | 211/195 |
| 5,054,723 A * | 10/1991 | Arnold | F16L 3/00 | 248/65 |
| 5,209,009 A * | 5/1993 | Fast | A01K 97/10 | 43/21.2 |
| 5,242,050 A * | 9/1993 | Billings | F42B 39/007 | 224/916 |
| 5,321,904 A * | 6/1994 | Benson | A01K 97/10 | 248/223.41 |
| 5,331,761 A * | 7/1994 | Kuthy | A01K 97/06 | 206/315.11 |
| 5,414,953 A * | 5/1995 | Taylor | A01K 97/10 | 43/21.2 |
| 5,535,538 A * | 7/1996 | Heuke | A01K 91/065 | 43/26.1 |
| 5,752,340 A * | 5/1998 | Fleener | A01K 97/10 | 248/512 |
| 5,758,933 A * | 6/1998 | Clendening | A47B 91/02 | 312/282 |
| 5,855,087 A * | 1/1999 | Risinger | A01K 97/10 | 248/910 |
| 5,913,673 A * | 6/1999 | Womac | A01K 97/10 | 43/21.2 |
| 5,938,023 A * | 8/1999 | Herron | B25H 3/023 | 206/315.11 |
| 5,941,015 A * | 8/1999 | Jenkins | A01K 97/06 | 43/17.5 |
| 6,052,939 A * | 4/2000 | McClain | A01K 97/22 | 206/315.11 |
| 6,185,860 B1 * | 2/2001 | Thibodeaux | A01K 97/10 | 206/315.11 |
| 6,370,810 B1 * | 4/2002 | Widerman | F16L 3/137 | 248/205.3 |
| 6,374,532 B1 * | 4/2002 | Klein | A01K 97/10 | 43/17 |
| D460,859 S * | 7/2002 | Tipton | D3/905 | |
| 6,446,382 B1 * | 9/2002 | Cloutier | A01K 97/06 | 43/57.1 |
| 6,729,066 B1 * | 5/2004 | Howley | A01K 97/06 | 43/56 |
| 7,051,471 B1 * | 5/2006 | Ausborne, Jr. | A01K 97/06 | 206/315.11 |
| 7,281,346 B1 * | 10/2007 | Cook | F41A 23/02 | 206/315.11 |
| 7,621,073 B2 * | 11/2009 | O'Keeffe | A01K 97/06 | 43/54.1 |
| 7,650,713 B1 * | 1/2010 | Peede | A01K 97/10 | 43/21.2 |
| 7,726,478 B2 * | 6/2010 | Potterfield | F41C 33/06 | 206/317 |
| 8,052,020 B1 * | 11/2011 | Wurtz | A01K 97/22 | 224/676 |
| 2004/0237374 A1 * | 12/2004 | Klein | A01K 97/01 | 43/21.2 |
| 2005/0039377 A1 * | 2/2005 | Clary | A01K 97/06 | 43/21.2 |
| 2005/0050791 A1 * | 3/2005 | Placek | A01K 97/06 | 43/54.1 |
| 2005/0155276 A1 * | 7/2005 | O'Keeffe | A01K 97/06 | 43/21.2 |
| 2006/0236589 A1 * | 10/2006 | Boyette | A01K 97/10 | 43/55 |
| 2009/0071058 A1 * | 3/2009 | Chavez | A01K 97/06 | 43/21.2 |
| 2009/0119969 A1 * | 5/2009 | Cavanaugh | A01K 97/22 | 43/21.2 |
| 2012/0005941 A1 * | 1/2012 | Lan | A01K 97/20 | 43/21.2 |
| 2013/0340317 A1 * | 12/2013 | Skiles | A01K 97/06 | 43/21.2 |
| 2014/0068998 A1 * | 3/2014 | Peak | A01K 97/06 | 43/55 |
| 2015/0335002 A1 * | 11/2015 | Andrews | A01K 97/10 | 43/54.1 |

FOREIGN PATENT DOCUMENTS

| | | | | |
|---|---|---|---|---|
| FR | 2896378 A1 * | 7/2007 | | A01K 97/10 |
| GB | 2138261 A * | 10/1984 | | A01K 97/22 |
| GB | 2219716 A * | 12/1989 | | A01K 97/10 |
| GB | 2289200 A * | 11/1995 | | A01K 97/10 |
| GB | 2487415 A * | 7/2012 | | A01K 97/10 |
| JP | H01181736 A * | 7/1989 | | |
| JP | H01273533 A * | 11/1989 | | |
| JP | H01300836 A * | 12/1989 | | |
| JP | H07241153 A * | 9/1995 | | |
| JP | H07274790 A * | 10/1995 | | |
| JP | 08023849 A * | 1/1996 | | |
| JP | H08256656 A * | 10/1996 | | |
| JP | H08280309 A * | 10/1996 | | |
| JP | H08280310 A * | 10/1996 | | |
| JP | H09182551 A * | 7/1997 | | |
| JP | H10262532 A * | 10/1998 | | |
| JP | H10276645 A * | 10/1998 | | |
| JP | 11069935 A * | 3/1999 | | |
| JP | 2002017226 A * | 1/2002 | | |
| JP | 2002345384 A * | 12/2002 | | |
| JP | 2004089175 A * | 3/2004 | | |
| JP | 2004215600 A * | 8/2004 | | |
| JP | 2008125513 A * | 6/2008 | | A01K 97/04 |
| JP | 2009100727 A * | 5/2009 | | |
| JP | 3155742 U * | 12/2009 | | |
| JP | 3156366 U * | 12/2009 | | |
| JP | 2010200744 A * | 9/2010 | | |
| JP | 2013046581 A * | 3/2013 | | |
| JP | 2013123381 A * | 6/2013 | | |
| KR | 20030060138 A * | 7/2003 | | |
| KR | 20030076862 A * | 9/2003 | | |
| KR | 100886102 B1 * | 2/2009 | | |
| KR | 100946182 B1 * | 3/2010 | | |
| KR | 200463080 Y1 * | 10/2012 | | |
| KR | 200464988 Y1 * | 1/2013 | | |
| KR | 101298262 B1 * | 8/2013 | | |
| KR | 101321982 B1 * | 10/2013 | | |
| KR | 20130122050 A * | 11/2013 | | |
| KR | 101381456 B1 * | 4/2014 | | |
| KR | 20150052425 A * | 5/2015 | | |

* cited by examiner

TACKLE BOX WITH POLE SUPPORT

This application is a Continuation-in-Part application of non-provisional patent application Ser. No. 14/283,519, filed on May 21, 2014, and priority is claimed thereto.

FIELD OF THE PRESENT INVENTION

The present invention relates to the field of fishing accessories, and more specifically relates to a tackle box that includes an extension to provide support and an anchor to a fishing pole.

BACKGROUND OF THE PRESENT INVENTION

Fishing is a fun recreational and sporting activity enjoyed by many people. Some prefer to fish for pleasure, while others fish for sport. Fishermen have their preferred methods to fish, but a few concepts are common to all; utilizing a hook and a line to snare a fish. Even though the basic concept is simple, the techniques used have transformed fishing into what some consider an art form, with a preferred style for everyone. Also, the type, size, and weight of the fish sought can determine the length, weight, flexibility, and speed of the rod. While the sport is fun, there is often a lot of gear that must be carried and lugged to the fishing location. All of the equipment may get heavy, causing transport to be difficult and cumbersome. Tackle boxes simplify having to carry individually pieces of gear, but they cannot carry the fishing rod. The user must separately hold the tackle box and pole to their desired fishing spot.

Additionally, while fishing the fisherman must continuously support and brace their pole until they reel in the line. For assistance, some people dig a small hole and burry a portion of the handle into the ground to hold the pole upright. Alternatively, pole holders are available to provide a resting spot upon which the fisherman may lay their pole. While these devices are helpful it adds yet another item that the user must lug around while fishing. Therefore, it would be beneficial in the art to provide a way to support a fishing pole that doesn't require more cumbersome equipment that the user must carry. Additionally, if there were an apparatus specifically configured to secure a fishing pole during use without the need for additional pole holding equipment beyond a tacklebox, the experience of fishing could be easier and more enjoyable.

Thus, there is a need for a new form of tacklebox equipped with the capacity to carry a fishing pole, both in transit, as well as a means by which the fishing pole may be secured during use for hands-free fishing. Such a device is preferably equipped with a dedicated fishing pole holder, which is retractable such that it may be moved out of the way when not needed or not in use.

SUMMARY OF THE PRESENT INVENTION

In view of the foregoing disadvantages inherent in the prior art, the general purpose of the present invention is to provide a tackle box with pole support to maintain a fishing pole in an erect position, configured to include all of the advantages of the prior art, and to overcome the drawbacks inherent therein.

Accordingly, an object of the present invention is to provide a tackle box with pole support that adds a fishing pole support to a tackle box to position the fishing pole upright. Another object of the present invention is to provide a tack box with pole support that includes a rest that extends upward and a support that extends out, where both the rest and support brace the fishing pole during use.

To achieve the above objects, in an aspect of the present invention, a tackle box with pole support is described comprising a tackle box, where the tackle box is divided between a top portion and a bottom portion; a rest attached to a side of the top portion of the tackle box, where the rest moves from a retracted position upward into an extended position to receive a rod of the fishing pole; a lock on the rest, where the lock secures the rest into the extended position; and an extendable support within the bottom portion of the tackle box, where the extendable support moves on a slide in and out of an opening in the bottom portion to brace a handle of the fishing pole while the rod is positioned within the rest.

These together with other aspects of the present invention, along with the various features of novelty that characterize the present invention, are pointed out with particularity in the claims annexed hereto and form a part of this present invention. For a better understanding of the present invention, its operating advantages, and the specific objects attained by its uses, reference should be made to the accompanying drawings and descriptive matter in which there are illustrated exemplary embodiments of the present invention.

BRIEF DESCRIPTION OF THE DRAWINGS OF THE PRESENT INVENTION

The advantages and features of the present invention will become better understood with reference to the following detailed description and claims taken in conjunction with the accompanying drawings, wherein like elements are identified with like symbols, and in which:

Figure 5:
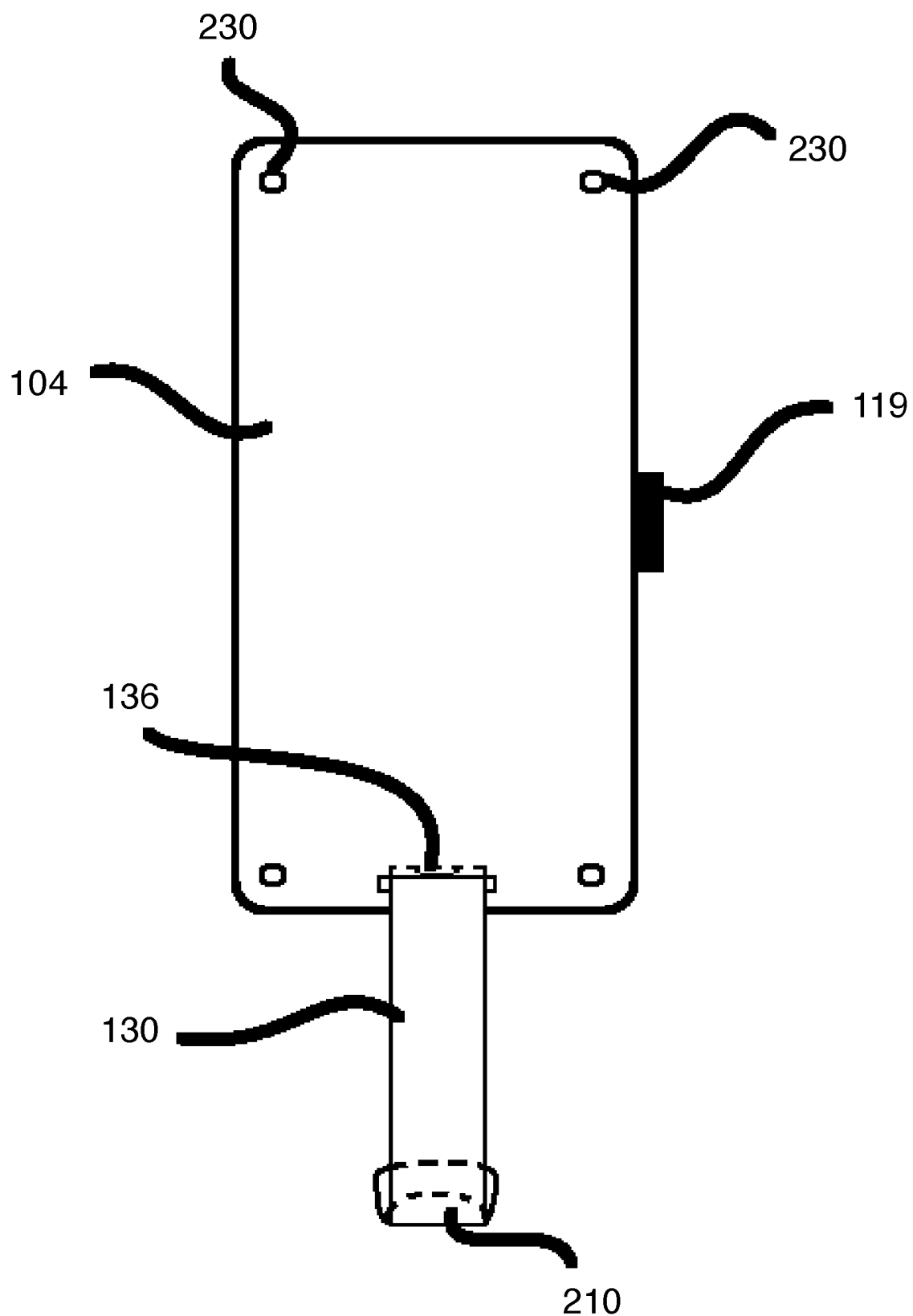

FIG. 5 exhibits a view of a bottom of the tackle box, depicting the extendable support in the extended position, and the stopper preventing over-extension of the slide.

Like reference numerals refer to like parts throughout the description of several views of the drawings.

DETAILED DESCRIPTION OF THE PRESENT INVENTION

The present invention relates to a tackle box that includes an extension to provide support and an anchor to a fishing pole. The present invention provides a tackle box with pole support to combine a tackle box with a fishing pole holder into a single device. The tackle box of the present invention includes an extendable support that braces a handle of a fishing pole against the box. An adjustable rest lifts from the top of the tackle box to secure the fishing pole and prevent falling or sliding during use. The tackle box with pole support eliminates having to stick the handle into the ground, and offers the user an easy to use and convenient way to relax while fishing.

Figure 1:
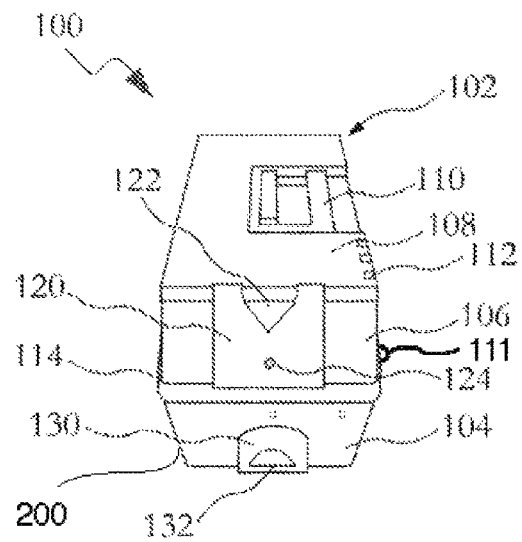
FIG. 1 depicts a perspective view of a tackle box with pole support in accordance with an exemplary embodiment of the present invention.

Turning now descriptively to the drawings, referring to FIG. 1, a perspective view of a tackle box with pole support (100) is shown in accordance with an exemplary embodiment of the present invention. The tackle box with pole support (100) includes a tackle box (102) having a housing (200) divided between a bottom portion (104) and a top portion (106) and at least one hinge (111) disposed at a junction of the top portion (106) and the bottom portion (104). The tackle box (102) further includes a lid (108) attached on a hinge (112) and a handle (110) to easily carry and transport the tackle box (102).

Figure 3:
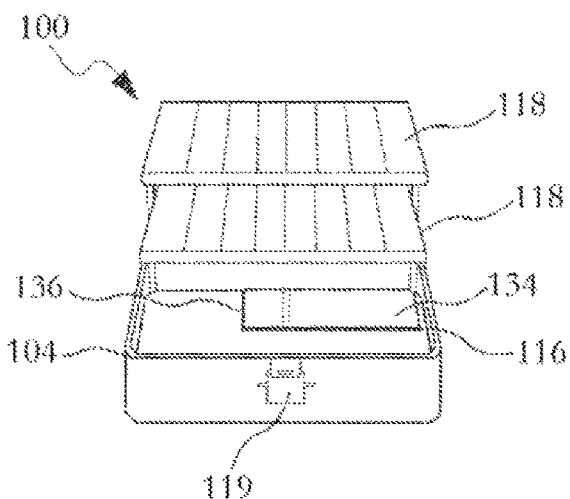
FIG. 3 depicts a front view of a bottom portion of a tackle box with pole support in accordance with an exemplary embodiment of the present invention.

The tackle box (102) may be generally plastic, and with filled with multiple shelves (118) (illustrated in FIG. 3) and storage compartments to receive and protect all of the bait and accessories a fisherman may need. The tackle box (102) includes a closure (119) as illustrated in FIG. 3 to secure the top portion (106) against the bottom portion (104). The closure (119) is preferably a conventional friction-based latch to ensure that the top portion (106) does not separate from the bottom portion (104) without deliberate action from the owner, preventing accidental spills of the contents of the tackle box (102) if dropped. Additionally, the bottom of the bottom portion (104) may be equipped with feet (230) to further help to stabilize the apparatus during use.

On a side (114) of the tackle box (102) a rest (120) is fastened against the top portion 106. The rest (120) includes a receiving portion (122) which accepts a rod of a fishing pole. The receiving portion (122) may be V-shaped, semi-circular, or square-shaped to balance the rod while resting against the tackle box (102). The receiving portion (122) helps to center the pole on top of the tackle box (102). The rest (120) moves against the side (114) up and down, and is secured into position with a lock (124). As illustrated, when in the storage position or retracted position, the rest (120) is flush against the lid (108) to prevent the rest (120) from catching on anything when not in use. The bottom portion (104) of the tackle box (102) additionally includes an extendable support (130). The extendable support (130) slides in and out of the bottom portion (104) as needed to maintain the fishing pole in an upright position while resting against the rest (120). The extendable support (130) may include a support handle (132) to withdraw and insert the support (130) as needed. The extendable support (130) may have a cutout such that the end of the handle of the rod may be disposed to more securely hold the bottom of the rod during use.

Figure 2:
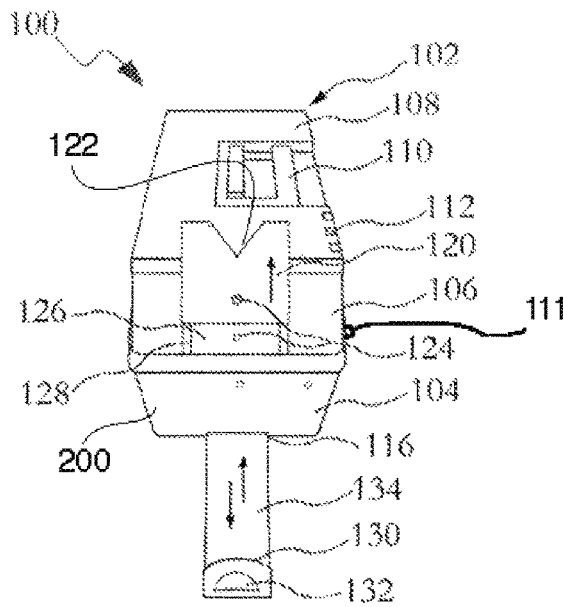
FIG. 2 depicts a perspective view of a tackle box with pole support in an extended position in accordance with an exemplary embodiment of the present invention.

Referring now to FIG. 2, a perspective view of the tackle box with pole support (100) in an extended position in accordance with an exemplary embodiment of the present invention. In the extended position the rest (120) raises above the lid (108) to enable the receiving portion to accept the rod. The rest (120) moves along a track (126) with a pair of lateral guides (128). The lock (124) secures the rest (120) at various heights along the track (126) to adjust the angle of the fishing pole while braced against the extendable support (130). The lock (124) includes at least two locking buttons to hold the rest (120) in at least one elevated position against the side (114). The locking buttons of the lock (124) are preferably spring-based expansion buttons, similar to those found on extending umbrellas, although the lock (124) may alternately be equipped with a screw, expanding fastener, or similar locking mechanism known in the art. It should be noted that the locking buttons of the lock (124) may be present in pairs for additional support, and that there may be more than two locking buttons in some embodiments of the present invention.

The extendable support (130) slides out of the bottom portion (104) on a slide (134). The slide (134) is received by an opening (116) within the tackle box (102). The extendable support (130) is preferably configured to slide out and away from the housing (200) of the tackle box (102) without completely exiting the bottom portion (104) of the tackle box (102). As such, the extendable support (130) is preferably prevented from extending too far via a protrusion, notch, or similar impeding element disposed at the end of the extendable support (130), referenced as a stopper (136) in FIG. 3.

Referring to FIG. 3, a front view of the bottom portion (104) is shown. The bottom portion (104) may include one or more trays (118) with storage to divide and organize all of the user's tools (hooks, line, lures, etc.) per a conventional tackle box. The slide (134) moves within the bottom portion (104) in and out of the opening (116). At a far end of the slide (134) may be a stopper (136) to prevent the slide (134) from being completely removed from the bottom portion (104) when in the extended position.

Figure 4:
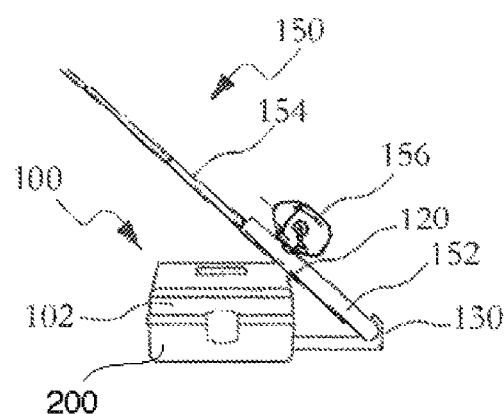
FIG. 4 depicts a perspective view of a tackle box with pole support and a fishing pole in accordance with an exemplary embodiment of the present invention.

Referring to FIG. 4, a perspective view of the present invention is shown with the fishing pole (150) disposed in the rest (120). During use, the user may pull support handle to withdraw the extendable support (130) to a maximum slide length. The handle (152) of the fishing pole (150) rests against the support handle. The top portion of the handle (152) or rod (154) is then placed within the rest (120) to brace the fishing pole (150) in an erect, angled, and/or upright position. The rest (120) is adjusted so that the angle of the fishing pole is stable enough to maintain the erect position without sliding or falling.

The reel (156) of the fishing pole (150) is preferably placed above the rest (120) to prevent interference when reeling in a fish. With the fishing pole support (100) the user is provided a convenient tool offering the storage utility of a tackle box while also presenting a beneficial support device. Further, as denoted in the figures, it should be understood that the rest (120) is equipped with a receiving portion having a semi-circular or V-shape configured to conform to the cylindrical or generally cylindrical shape of a handle of a conventional fishing rod. Additionally, as shown in FIG. 2 and FIG. 4, the extendable support (130) is preferably equipped with an indentation, cutout, lip (210) or similar mechanism configured to retain the fishing pole in an upright position even in the event that a tip of the fishing rod is pulled or bent downward as conventionally occurs when a fish bites. As such, the lip (210) is arranged such that it is angled up and backwards against a primary plane of the slide (134) of the extendable support (130), forming a "V" or "U" shape. The lip (210) is configured to maintain contact with the handle of the fishing pole, serving as a counter to any force exerted downward on the tip of the pole.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The exemplary embodiment was chosen and described in order to best explain the principles of the invention and its practical application, to thereby enable others skilled in the art to best utilize the invention and various embodiments with various modifications as are suited to the particular use contemplated.

The invention claimed is:

1. A fishing pole holder for a fishing pole having a handle and a tip, the fishing pole holder comprising:
    a housing, said housing having a top portion and a bottom portion;
    at least one hinge, said at least one hinge disposed at a junction of said top portion and said bottom portion;
    wherein said housing is configured to open with said top portion lifting up and away from said bottom portion about said at least one hinge;
    a rest, said rest disposed on a side of said top portion of said housing;
    wherein said rest is configured to extend up and out of a track equipped with a pair of lateral guides which is disposed on said side of said top portion of said housing;
    a V-shaped cutout, said V-shaped cutout disposed on a top of said rest;
    wherein said V-shaped cutout is configured to hold the fishing pole in a stationary upright position;
    an extendable support, said extendable support disposed in communication with a bottom of said bottom portion of said housing;
    an extendable support receiver, said extendable support receiver disposed as part of said bottom of said bottom portion of said housing and in communication with said extendable support and configured to contain said extendable support;
    wherein said extendable support is configured to slide out and away from said extendable support receiver of said bottom portion on a slide of said extendable support without disconnecting from said bottom portion;
    wherein said extendable support has a first end disposed in communication with said extendable support receiver and a second end;
    wherein said first end of said extendable support is equipped with a stopper to prevent over-extension of said slide from said extendable support receiver;
    wherein said second end of said extendable support is equipped with a lip configured to bind against the handle of the fishing pole, further securing the fishing pole in a stationary and stable upright position, said lip angled upwardly from said second end of said extendable support so as to be above said slide and extending toward said first end of said extendable support to form an enclosed area for receiving the handle of the fishing pole therein; and
    wherein said rest serves as a fulcrum and said lip serves as a counter to any force exerted downward on the tip of the fishing pole.

2. The apparatus of claim 1, wherein said extendable support receiver is an opening in said bottom portion of said housing.

3. The apparatus of claim 2, further comprising:
    a lock, said lock disposed in communication with said rest; and
    wherein said lock is configured to maintain said rest in at least one elevated position against the side of said top portion of said housing.

4. The apparatus of claim 2, further comprising:
    at least one tray, said at least one tray disposed within said bottom portion of said housing; and
    wherein said at least one tray is equipped with dividers.

5. The apparatus of claim 2, further comprising:
    a support handle, said support handle disposed on said second end of said extendable support, facilitating manual extension and retraction of said extendable support.

6. The apparatus of claim 1, further comprising:
    a lock, said lock disposed in communication with said rest; and
    wherein said lock is configured to maintain said rest in at least one elevated position against the side of said top portion of said housing.

7. The apparatus of claim 6, further comprising:
    at least one tray, said at least one tray disposed within said bottom portion of said housing; and
    wherein said at least one tray is equipped with dividers.

8. The apparatus of claim 6, further comprising:
    a support handle, said support handle disposed on said second end of said extendable support, facilitating manual extension and retraction of said extendable support.

9. The apparatus of claim 1, further comprising:
    at least one tray, said at least one tray disposed within said bottom portion of said housing; and
    wherein said at least one tray is equipped with dividers.

10. The apparatus of claim 1, wherein said rest is disposed flush with a lid of said top portion when said rest is in a retracted position.

11. The apparatus of claim 1, further comprising:
    a support handle, said support handle disposed on said second end of said extendable support, facilitating manual extension and retraction of said extendable support.

12. A fishing pole holder for a fishing pole having a handle and a tip, the fishing pole holder comprising:
    a housing, said housing having a top portion and a bottom portion;
    at least one hinge, said at least one hinge disposed at a junction of said top portion and said bottom portion;
    wherein said housing is configured to open with said top portion lifting up and away from said bottom portion about said at least one hinge;
    a rest, said rest disposed on a side of said top portion of said housing;
    wherein said rest is configured to extend up and out of a track equipped with a pair of lateral guides which is disposed on said side of said top portion of said housing;
    a V-shaped cutout, said V-shaped cutout disposed on a top of said rest;
    wherein said V-shaped cutout is configured to hold the fishing pole in a stationary upright position;
    an extendable support, said extendable support disposed in communication with a bottom of said bottom portion of said housing;
    an extendable support receiver, said extendable support receiver disposed as part of said bottom of said bottom portion of said housing and in communication with said extendable support and configured to contain said extendable support;
    wherein said extendable support is configured to slide out and away from said extendable support receiver of said bottom portion on a slide of said extendable support without disconnecting from said bottom portion;
    wherein said extendable support has a first end disposed in communication with said extendable support receiver and a second end;

wherein said first end of said extendable support is equipped with a stopper to prevent over-extension of said slide from said extendable support receiver;

wherein said second end of said extendable support is equipped with a lip configured to bind against the handle of the fishing pole, further securing the fishing pole in a stationary and stable upright position, said lip angled upwardly from said second end of said extendable support so as to be above said slide and extending toward said first end of said extendable support to form an enclosed area for receiving the handle of the fishing pole therein;

wherein said rest serves as a fulcrum and said lip serves as a counter to any force exerted downward on the tip of the fishing pole;

wherein said extendable support receiver is an opening in said bottom portion of said housing;

a lock, said lock disposed in communication with said rest;

wherein said lock is configured to maintain said rest in at least one elevated position against the side of said top portion of said housing;

at least one tray, said at least one tray disposed within said bottom portion of said housing;

wherein said at least one tray is equipped with dividers;

wherein said rest is disposed flush with a lid of said top portion when the rest is in a retracted position; and a support handle, said support handle disposed on said second end of said extendable support, facilitating manual extension and retraction of said extendable support.

* * * * *